(12) United States Patent
Yokoyama et al.

(10) Patent No.: US 10,544,326 B2
(45) Date of Patent: Jan. 28, 2020

(54) LOW TEMPERATURE CURING COATING COMPOSITION CONTAINING SAG CONTROL AGENT AND USE THEREOF

(71) Applicant: AXALTA COATING SYSTEMS IP CO., LLC, Wilmington, DE (US)

(72) Inventors: Ayumu Yokoyama, Media, PA (US); Rajesh Gopalan Saliya, Wilmington, DE (US); Eric C. Houze, Mullica Hill, NJ (US); Violeta Ilieva Petkovska, Philadelphia, PA (US)

(73) Assignee: Axalta Coating Systems IP Co., LLC, Wilmington, DE (US)

( * ) Notice: Subject to any disclaimer, the term of this patent is extended or adjusted under 35 U.S.C. 154(b) by 647 days.

(21) Appl. No.: 14/379,831

(22) PCT Filed: Jan. 29, 2013

(86) PCT No.: PCT/US2013/023593
§ 371 (c)(1),
(2) Date: Aug. 20, 2014

(87) PCT Pub. No.: WO2013/126186
PCT Pub. Date: Aug. 29, 2013

(65) Prior Publication Data
US 2015/0337166 A1 Nov. 26, 2015

Related U.S. Application Data

(60) Provisional application No. 61/601,250, filed on Feb. 21, 2012.

(51) Int. Cl.
| | | |
|---|---|---|
| *C09D 175/00* | (2006.01) | |
| *C09D 175/04* | (2006.01) | |
| *C08G 18/38* | (2006.01) | |
| *C09D 175/02* | (2006.01) | |
| *C09D 201/02* | (2006.01) | |
| *C08K 5/21* | (2006.01) | |

(52) U.S. Cl.
CPC ....... *C09D 175/04* (2013.01); *C08G 18/3819* (2013.01); *C09D 175/02* (2013.01); *C09D 201/02* (2013.01); *C08K 5/21* (2013.01)

(58) Field of Classification Search
CPC .. C09D 175/04; C09D 175/02; C09D 201/02; C08G 18/3819; C08K 5/21
See application file for complete search history.

(56) References Cited

U.S. PATENT DOCUMENTS

| | | | |
|---|---|---|---|
| 4,965,317 A | 10/1990 | Kania et al. | |
| 6,642,305 B2 * | 11/2003 | Van Heugten | ....... G08G 18/544 524/212 |
| 2004/0127674 A1 | 7/2004 | Haubennestel et al. | |
| 2006/0004150 A1 * | 1/2006 | Baumgart | .............. C08G 71/00 525/419 |
| 2006/0046068 A1 | 3/2006 | Barancyk et al. | |
| 2006/0223954 A1 | 10/2006 | Brinkhuis et al. | |
| 2011/0269884 A1 | 11/2011 | Yokoyama et al. | |

OTHER PUBLICATIONS

ISA Korean Intellectual Property Office, International Preliminary Report on Patentability for International Application No. PCT/US2013/023593, dated Sep. 4, 2014.
ISA Korean Intellectual Property Office, International Search Report and Written Opinion for International Application No. PCT/US2013/023593, dated May 15, 2013.

* cited by examiner

*Primary Examiner* — Michael L Leonard
(74) *Attorney, Agent, or Firm* — Lorenz & Kopf, LLP

(57) ABSTRACT

The present disclosure is directed to a coating composition for producing coatings sag-free at high coating thicknesses, being quick dry and having good appearance. This disclosure is further directed to a coating composition comprising a crosslinking activator comprising: a) one or more alkylated melamines that are essentially unreactive to a polyisocyanate, and b) a polyurea sag control agent formed by reacting an amine and an isocyanate in the presence of the alkylated melamines. The coating composition can be used to form coating layers having a sag-free wet coating thickness in a range of from 10 to 36 mil (about 0.25 to 0.91 mm). The coating composition can be particularly suitable for vehicle coatings.

20 Claims, No Drawings

LOW TEMPERATURE CURING COATING COMPOSITION CONTAINING SAG CONTROL AGENT AND USE THEREOF

CROSS-REFERENCE TO RELATED APPLICATIONS

This application is a U.S. National-Stage entry under 35 U.S.C. § 371 based on International Application No. PCT/US2013/023593, filed Jan. 29, 2013, which was published under PCT Article 21(2) and which claims priority to U.S. Provisional Application No. 61/601,250, filed Feb. 21, 2012, which are all hereby incorporated in their entirety by reference.

FIELD OF DISCLOSURE

The present disclosure is directed to a coating composition for producing coatings being quick dry, having good appearance and being sag-free at high coating thicknesses.

BACKGROUND OF DISCLOSURE

A typical coating finish over a substrate comprises some or all of the following layers: (1) one or more primer layers that provide adhesion and basic protection, and also cover minor surface unevenness of the substrate; (2) one or more colored layers, typically pigmented, that provide most of the protection, durability and color; and (3) one or more clearcoat layers that provide additional durability and improved appearance. A colored topcoat layer can be used in place of the colored layer and clearcoat layer.

In some industrial applications, such as coating metal pipes, trucks, large industrial equipments, and large entertainment equipments, it is often desired to complete the coating process in a short period of time while still achieving good adhesion, protection, durability and appearance. Conventional coating compositions typically produce a thin cured dry coating layer that may not have sufficient thickness to cover unevenness of the substrate when only a single layer is used. That could result in undesired appearance. When conventional coatings are applied at a high coating thickness, surface coating defects such as microfoaming, low gloss, and sagging may occur. Thick coating layers are typically prone to sagging defects, especially for coating layers applied on vertical surfaces.

Therefore, there is a need for a coating composition that can produce a coating being sag-free at high coating thicknesses and having good appearance.

STATEMENT OF DISCLOSURE

This disclosure is directed to a coating composition comprising:
A1) a crosslinkable component comprising one or more film forming polymers having one or more crosslinkable functional groups; and
A2) a crosslinking component comprising a crosslinking activator having one or more crosslinking functional groups that react with the crosslinkable functional groups, the crosslinking activator comprises:
a) one or more alkylated melamines that are essentially unreactive to a polyisocyanate; and
b) a polyurea sag control agent formed by reacting an amine and an isocyanate in the presence of the one or more alkylated melamines.

This disclosure is also directed to a process for forming a sag-free coating layer on a substrate, the process comprising the steps of:
B1) applying a coating composition over the substrate to form a sag-free wet coating layer having a wet coating thickness in a range of from 10 to 36 mils, wherein the coating composition comprises:
B1a) a crosslinkable component comprising one or more film forming polymers having one or more crosslinkable functional groups; and
B1b) a crosslinking component comprising a crosslinking activator having one or more crosslinking functional groups that react with the crosslinkable functional groups, the crosslinking activator comprises:
a) one or more alkylated melamines that are essentially unreactive to a polyisocyanate; and
b) a polyurea sag control agent formed by reacting an amine and an isocyanate in the presence of the one or more alkylated melamines; and
B2) curing the sag-free wet coating layer at a temperature in a range of from 15° C. to 60° C. to form the sag-free coating layer.

This disclosure is further directed to a crosslinking activator for a coating composition, the crosslinking activator comprising:
one or more alkylated melamines that are essentially unreactive to a polyisocyanate; and
a polyurea sag control agent formed by reacting an amine and an isocyanate in the presence of the one or more alkylated melamines.

DETAILED DESCRIPTION

The features and advantages of the present disclosure will be more readily understood, by those of ordinary skill in the art, from reading the following detailed description. It is to be appreciated that certain features of the disclosure, which are, for clarity, described above and below in the context of separate embodiments, may also be provided in combination in a single embodiment. Conversely, various features of the disclosure that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both proceeded by the word "about." In this manner, slight variations above and below the stated ranges can be used to achieve substantially the same results as values within the ranges. Also, the disclosure of these ranges is intended as a continuous range including every value between the minimum and maximum values.

As used herein:

"Gloss" means surface gloss of a coating surface and is related to the amount of incident light that is reflected at the specular reflectance angle of the mean of that surface. Gloss can be measured with a specular glossmeter, such as those available from Byk-Gardener, Geretsried, Germany.

"DOI" (Distinctness of Image) is a quantitative measure of coating appearance that measures the light reflected at and around the specular reflectance angle. It can be determined according to the method described in ASTM D 5767. DOI can be measured with wave scan instruments, such as those available from Byk-Gardener, Geretsried, Germany. DOI measures not only the amount of incident light that is reflected at the specular reflectance angle, but also the distribution of the reflected light around the reflectance specular angle, typically +/−0.3° from the specular angle. A coating surface that gives fuzzy or distorted image generally produces lower DOI reading. A coating reflecting 100% of lights at the specular angle gives a DOI reading of 100.

The term "volatile organic compound", "VOC", "volatile organic compounds", or "VOCs" refers to organic chemical compounds of carbon that can vaporize and enter the atmosphere and participate in atmospheric photochemical reactions. VOCs can be naturally occurring or produced from natural or synthetic materials. Some or all VOCs can be regulated under local, national, regional, or international authorities. VOC can be expressed as weight of VOC on a unit of volume of a product, such as pounds per gallon (lbs/gal). Amounts of VOC in a coating composition can be determined according to ASTM D3960.

The term "sag" or "sagging" refers to coating defects such as dropping line, sagging curtains, tearing drops, or other defects and variations in coating that cause the coating to be un-smooth. The term "sag-free" or "free of sagging" or "free of sag" means a coating that is free of sagging defects. It is known to those skilled in the art that a thick wet coating layer tends to form sagging defects. Sagging of coatings can be measured according to ASTM D 4400.

The term "a coating layer" or "a single coating layer" means a layer of coating formed after curing or drying of a wet coating layer of a coating composition. Such single wet coating layer can be formed by any conventional coating application methods known to those skilled in the art, such as spraying, brushing, dipping, rolling, or wet draw down.

The term "two-pack coating composition", also known as 2K coating composition, refers to a coating composition having two packages that are stored in separate containers and sealed to increase the shelf life of the coating composition during storage. The two packages are mixed just prior to use to form a pot mix, which has a limited pot life, typically ranging from a few minutes (15 minutes to 45 minutes) to a few hours (4 hours to 8 hours). The pot mix is then applied as a layer of a desired thickness on a substrate surface, such as an automobile body. After application, the layer dries and cures at ambient or at elevated temperatures to form a coating on the substrate surface having desired coating properties, such as, adhesion, high gloss, and high DOI.

The term "crosslinkable component" refers to a component having "crosslinkable functional groups" that are functional groups positioned in each molecule of the compounds, oligomer, polymer, the backbone of the polymer, pendant from the backbone of the polymer, terminally positioned on the backbone of the polymer, or a combination thereof, wherein these functional groups are capable of crosslinking with crosslinking functional groups (during the curing step) to produce a coating in the form of crosslinked structures. One of ordinary skill in the art would recognize that certain crosslinkable functional group combinations would be excluded, since, if present, these combinations would crosslink among themselves (self-crosslink), thereby destroying their ability to crosslink with the crosslinking functional groups. A workable combination of crosslinkable functional groups refers to the combinations of crosslinkable functional groups that can be used in coating applications excluding those combinations that would self-crosslink.

Typical crosslinkable functional groups can include hydroxyl, thiol, isocyanate, thioisocyanate, acetoacetoxy, carboxyl, primary amine, secondary amine, epoxy, anhydride, ketimine, aldimine, or a workable combination thereof. Some other functional groups such as orthoester, orthocarbonate, or cyclic amide that can generate hydroxyl or amine groups once the ring structure is opened can also be suitable as crosslinkable functional groups.

The term "crosslinking component" refers to a component having "crosslinking functional groups" that are functional groups positioned in each molecule of the compounds, oligomer, polymer, the backbone of the polymer, pendant from the backbone of the polymer, terminally positioned on the backbone of the polymer, or a combination thereof, wherein these functional groups are capable of crosslinking with the crosslinkable functional groups (during the curing step) to produce a coating in the form of crosslinked structures. One of ordinary skill in the art would recognize that certain crosslinking functional group combinations would be excluded, since, if present, these combinations would crosslink among themselves (self-crosslink), thereby destroying their ability to crosslink with the crosslinkable functional groups. A workable combination of crosslinking functional groups refers to the combinations of crosslinking functional groups that can be used in coating applications excluding those combinations that would self-crosslink. One of ordinary skill in the art would recognize that certain combinations of crosslinking functional group and crosslinkable functional groups would be excluded, since they would fail to crosslink and produce the film forming crosslinked structures. The crosslinking component can comprise one or more crosslinking agents that have the crosslinking functional groups.

Typical crosslinking functional groups can include hydroxyl, thiol, isocyanate, thioisocyanate, acetoacetoxy, carboxyl, primary amine, secondary amine, epoxy, anhydride, ketimine, aldimine, orthoester, orthocarbonate, cyclic amide or a workable combination thereof.

It would be clear to one of ordinary skill in the art that certain crosslinking functional groups crosslink with certain crosslinkable functional groups. Examples of paired combinations of crosslinkable and crosslinking functional groups can include: (1) amine and protected amine such as ketimine and aldimine functional groups generally crosslink with acetoacetoxy, epoxy, or anhydride functional groups; (2) isocyanate, thioisocyanate and melamine functional groups generally crosslink with hydroxyl, thiol, primary and secondary amine, ketimine, or aldimine functional groups; (3) epoxy functional groups generally crosslink with carboxyl, primary and secondary amine, ketimine, aldimine or anhydride functional groups; and (4) carboxyl functional groups generally crosslink with epoxy or isocyanate functional groups.

The term "binder" as used herein refers to film forming constituents of a coating composition. Typically, a binder can comprise a crosslinkable component and a crosslinking component in that the crosslinkable component can react with the crosslinking component to form crosslinked structures, such as coating films. The binder used herein can further comprise other polymers, compounds or molecules that are essential for forming crosslinked coatings having desired properties, such as good adhesion, high DOI and free of sagging at high coating thicknesses. Additional components, such as solvents, pigments, catalysts, rheology modifiers, antioxidants, UV stabilizers and absorbers, leveling agents, antifoaming agents, anti-cratering agents, or other conventional additives are not included in the term. One or more of those additional components can be included in the coating composition of this invention.

This disclosure is directed to a coating composition comprising:

A1) a crosslinkable component comprising one or more film forming polymers having one or more crosslinkable functional groups; and A2) a crosslinking component comprising a crosslinking activator having one or more crosslinking functional groups that react with the crosslinkable functional groups, the crosslinking activator comprises:

a) one or more alkylated melamines that are essentially unreactive to a polyisocyanate; and b) a polyurea sag control agent formed by reacting an amine and an isocyanate in the presence of the one or more alkylated melamines.

The alkylated melamines need to be essentially unreactive to a polyisocyanate. To be "essentially unreactive", a mixture of the one or more melamines and the polyisocyanate must stay un-gelled for at least 5 hours from the time of mixing and the viscosity of the mixture remains below 150% of the initial viscosity for at least 2 hours from the time of mixing at ambient temperatures such as a temperature in a range of from 15° C. to 60° C., wherein the initial viscosity is the viscosity of the mixture measured immediately after the one or more melamines and the polyisocyanate are just mixed. The measurement needs to be done under conditions to minimize the evaporation of solvents from the mixture to minimize viscosity change caused by the loss of solvents. The polyisocyanate can be a diisocyanate monomer, diisocyanate dimer, diisocyanate trimer, tri-functional isocyanates, trimers of tri-functional isocyanates, or a combination thereof. The mixture can have a weight ratio of the melamine and the polyisocyanate in a range of from 5:1 to 1:5. In one example, a melamine can be tested for it reactivity towards a polyisocyanate by mixing 1 weight part of the melamine and 1 weight part of a polyisocyanate, such as 1,6-hexamethylene diisocyanate ("HDI") trimer and measuring the viscosity of the mixture 0, 2 and 5 hour time point from mixing at ambient temperatures. The melamine can be determined as essentially unreactive to a polyisocyanate if the mixture is not gelled and the viscosity at 2 hour time point remains less than 150% of the initial viscosity measured at 0 hour time point. The alkylated melamines can be essentially unreactive to 1,6-hexamethylene diisocyanate ("HDI") monomer or trimer.

Any melamines that are essentially unreactive to a polyisocyanate can be suitable. In one example, the suitable melamine can include Cymel® XW-3106, commercially available under respective registered trademark or trademark from Cytec Industries, Inc., Wallingford, Conn. 06492, USA. The alkylated melamine can include alkylated melamine aldehyde condensation products or derivatives, such as alkylated melamine formaldehyde. In one example, the alkylated melamines that are essentially unreactive to a polyisocyanate can include fully alkylated melamines that are essentially free from isocyanate reactive H, such as —OH, —NH, —NH$_2$, or a combination thereof. The term "essentially free from isocyanate reactive H" means that the alkylated melamine can have minor amounts of functional groups having the isocyanate reactive H, such as —OH, —NH, —NH$_2$, or a combination thereof, and a mixture of the alkylated melamine and the polyisocyanate does not form gel and the crosslinking component can remain in a low viscosity range suitable for coating applications, such as mixing with a crosslinkable component for spraying, rolling, brushing, dipping, draw-down, or a combination thereof. The alkylated melamine can have in a range of from 0% to 10% in one example, 0% to 5% in another example, 0% to 1% in yet another example, 0% to 0.1% in yet another example, of melamine that have functional groups having the isocyanate reactive H, percentage based on the total weight of melamine in the crosslinking activator. The crosslinking activator can have in a range of from 0% to 10% in one example, 0% to 5% in another example, 0% to 1% in yet another example, 0% to 0.1% in yet another example, of melamines having —OH, —NH, —NH$_2$ groups, or a combination thereof, percentage based on the total weight of melamine in the crosslinking activator.

The alkylated melamine can be formed by first reacting with one or more C1-C5 aldehydes to form alcohols, and then react with one or more C1-C10 alkylation agents to form an alkylated melamine having one or more alkyl groups. The alkylated melamine can comprise alkyl groups selected from one or more C1-C10 alkyls. In one example, the alkylated melamine can comprise methyl groups. In another example, the alkylated melamine can comprise butyl groups. In yet another example, the alkylated melamine can comprise a combination of methyl and butyl groups. A melamine having all amine groups alkylated is referred to as a fully alkylated melamine Examples of fully alkylated melamine can include hexamethoxymethylmelamine (HMMM) and a melamine having butoxymethyl groups, ethoxymethyl groups, methoxymethyl groups, or a combination thereof.

When present in the crosslinking activator, the amount of melamine having isocyanate reactive H needs to be less than that of the isocyanate, and can be in a range of from 0% to 10% in one example, 0% to 5% in another example, 0% to 1% in yet another example, 0% to 0.1% in yet another example, of the isocyanate in the crosslinking activator, all percent being weight percent.

When a melamine is not essentially unreactive to a polyioscyanate, such as a melamine contains the isocyanate reactive H, for example —NH or —NH$_2$, over the range specified above, the mixture of the melamine and the polyisocyanate can react leading to undesired products or properties such high viscosity or gelling.

The crosslinking activator can consist essentially of: a) one or more alkylated melamines that are essentially unreactive to a polyisocyanate; and b) a polyurea sag control agent formed by reacting an amine and an isocyanate in the presence of the one or more alkylated melamines. In one example, the crosslinking activator can consist of in a range of from 80% to 99% of the one or more alkylated melamines that are essentially unreactive to a polyisocyanate; and in a range of from 1% to 20% of a polyurea sag control agent formed by reacting an amine and an isocyanate in the presence of the one or more alkylated melamines, percentage based on the total solid weight of the crosslinking activator. In another example, the crosslinking activator can consist of in a range of from 90% to 99% of the one or more alkylated melamines that are essentially unreactive to a polyisocyanate; and in a range of from 1% to 10% of a polyurea sag control agent formed by reacting an amine and an isocyanate in the presence of the one or more alkylated melamines, percentage based on the total solid weight of the crosslinking activator. Solid weight of the crosslinking activator can be determined by difference as known to those skilled in the art.

The crosslinking component can consist essentially of the crosslinking activator. The term "consist essentially of" means that the crosslinking component can have minor amounts of other ingredients, such as solvents, additives, or a combination thereof, in the amount of less than 10% of the total weight of the crosslinking component. In one example, the crosslinking component can consist of in a range of from 90% to 100% of the crosslinking activator. In another example, the crosslinking component can consist of in a range of from 95% to 100% of the crosslinking activator, percentage based on the total weight of the crosslinking component.

The polyurea sag control agent, also referred to as "SCA", can be formed by reacting an amine and an isocyanate in the presence of the one or more alkylated melamines. The amine can be added into the alkylated melamine first and followed by the addition of the isocyanate to ensure the formation of the sag control agent between the amine and the isocyanate. This can be important if some —OH groups are present in the melamine Due to the fact that the reaction rate between isocyanate and amine is much greater than the reaction rate between isocyanate and —OH, the isocyanate can react with the amine to form the SCA in the process described above even in the presence of any —OH groups in the melamine or in the crosslinking activator.

The isocyanate can be selected from 1,6-hexamethylene diisocyanate, 2,2,4-trimethylhexane-1,6-diisocyanate, 2,4,4-trimethylhexane-1,6-diisocyanate, cyclohexyl-1,4-diisocyanate, isophoron diisocyanate, adduct isophoron diisocyanate, adduct of hexamethylene diisocyanate, dicyclohexylmethane-4,4'-diisocyanate, xylylene diisocyanate, 1,3,5-trimethyl-2,4-bis(isocyanatomethyl)benzene, toluene diisocyanate, diphenylmethane-4,4'-diisocyanate, adduct of toluene diisocyanate, or a combination thereof.

The amine can be selected from benzyl amine, ethylamine, n-propylamine, 2-propylamine, n-butylamine, 2-butylamine, t-butylamine, n-pentylamine, α-methylbutylamine, α-ethylpropylamine, β-ethylbutylamine, hexylamine, octylamine, decylamine, stearylamine, cyclohexylamine, aniline, or a combination thereof. In one example, the amine can be benzyl amine and the isocyanate can be 1,6-hexamethylene diisocyanate.

The crosslinking activator formed herein can be free from un-reacted iscocyanates or free isocyanate groups since excess amount of amine is normally used.

The coating composition can comprise in a range of from 0.1% to 10% of the polyurea sag control agent, percent based on the total weight of the crosslinkable component and the crosslinking component. The coating composition can comprise in a range of from 0.1% to 10% of the SCA in one example, 0.2% to 8% in another example, 0.2% to 5% in yet another example, percent based on the total weight of the crosslinkable component and the crosslinking component.

The film forming polymers can be selected from acrylic polymers, polyester polymers, polyurethane polymers, alkyd resins, or a combination thereof. Typical polymers suitable for coating compositions can be suitable.

The acrylic polymers can have a weight average molecular weight (Mw) of about 1,500 to 100,000, and contain crosslinking functional groups, such as, for example, hydroxyl, amino, amide, glycidyl, silane and carboxyl groups. The acrylic polymers can be linear polymers, branched polymers, or other polymers. The acrylic polymers can be polymerized from a plurality of monomers, such as acrylates, methacrylates or derivatives thereof. Suitable monomers can include linear alkyl (meth)acrylates having 1 to 12 carbon atoms in the alkyl group, cyclic or branched alkyl (meth)acrylates having 3 to 12 carbon atoms in the alkyl group. Suitable monomers can also include, for example, hydroxyalkyl esters of alpha,beta-olefinically unsaturated monocarboxylic acids with primary or secondary hydroxyl groups. These may, for example, comprise the hydroxyalkyl esters of acrylic acid, methacrylic acid, crotonic acid and/or isocrotonic acid. Suitable monomers can also include monomers that are reaction products of alpha, beta-unsaturated monocarboxylic acids with glycidyl esters of saturated monocarboxylic acids branched in alpha position, for example with glycidyl esters of saturated alpha-alkylalkanemonocarboxylic acids or alpha,alpha'-dialkylalkanemonocarboxylic acids. These can comprise the reaction products of (meth)acrylic acid with glycidyl esters of saturated alpha,alpha-dialkylalkanemonocarboxylic acids with 7 to 13 carbon atoms per molecule, particularly preferably with 9 to 11 carbon atoms per molecule. These reaction products can be formed before, during or after copolymerization reaction of the acrylic polymer. Suitable monomers can further include monomers that are reaction products of hydroxyalkyl (meth)acrylates with lactones. Hydroxyalkyl (meth)acrylates which can be used include, for example, those stated above. Suitable lactones can include, for example, those that have 3 to 9 carbon atoms in the ring, wherein the rings can also comprise different substituents. The hydroxyl groups of the hydroxyalkyl esters can be modified with the lactone before, during or after the copolymerization reaction. Suitable monomers can also include unsaturated monomers such as, for example, allyl glycidyl ether, 3,4-epoxy-1-vinylcyclohexane, epoxycyclohexyl (meth)acrylate, vinyl glycidyl ether and glycidyl (meth)acrylate, that can be used to provide the acrylic polymer with glycidyl groups. In one example, glycidyl (meth)acrylate can be used. Suitable monomers can also include monomers that are free-radically polymerizable, olefinically unsaturated monomers which, apart from at least one olefinic double bond, do not contain additional functional groups. Such monomers include, for example, esters of olefinically unsaturated carboxylic acids with aliphatic monohydric branched or unbranched as well as cyclic alcohols with 1 to 20 carbon atoms. Suitable monomers can also include unsaturated monomers that do not contain additional functional groups for example, vinyl ethers, such as, isobutyl vinyl ether and vinyl esters, such as, vinyl acetate, vinyl propionate, vinyl aromatic hydrocarbons, preferably those with 8 to 9 carbon atoms per molecule. Examples of such monomers can include styrene, alpha-methylstyrene, chlorostyrenes, 2,5-dimethylstyrene, p-methoxystyrene, vinyl toluene. In one embodiment, styrene can be used. Suitable monomers can also include small proportions of olefinically polyunsaturated monomers. These olefinically polyunsaturated monomers are monomers having at least 2 free-radically polymerizable double bonds per molecule. Examples of these olefinically polyunsaturated monomers can include divinylbenzene, 1,4-butanediol diacrylate, 1,6-hexanediol diacrylate, neopentyl glycol dimethacrylate, and glycerol dimethacrylate.

The acrylic polymers of this disclosure can generally be polymerized by free-radical copolymerization using conventional processes well known to those skilled in the art, for example, bulk, solution or bead polymerization, in particular by free-radical solution polymerization using free-radical initiators.

The acrylic polymer can contain (meth)acrylamides. Typical examples of such acrylic polymers can be polymerized from monomers including (meth)acrylamide. In one example, such acrylic polymer can be polymerized from (meth)acrylamide and alkyl (meth)acrylates, hydroxy alkyl (meth)acrylates, (meth)acrylic acid and one of the aforementioned olefinically unsaturated monomers.

The acrylic polymers can have one or more crosslinkable functional groups. At least one of the one or more crosslinkable functional groups can be a hydroxyl group.

The polyester polymers can be linear polyesters or copolyesters, branched polyesters or copolyesters, highly branched polyesters or copolyesters, or a combination thereof. The highly branched copolyester can have a hydroxyl number in a range of from 5 to 200 and can have a weight average molecular weight in a range of from 1,000 to 50,000.

The polyester polymers can have one or more crosslinkable functional groups. At least one of the one or more crosslinkable functional groups can be a hydroxyl group.

Polyurethane polymers can be suitable for the coating composition of this disclosure. Examples of polyurethane polymers can include acrylourethanes. Typical useful acrylourethanes can be formed by reacting the aforementioned acrylic polymers with an organic polyisocyanate. Generally, an excess of the acrylic polymer is used so that the resulting acrylourethane can have terminal acrylic segments having reactive groups such as crosslinkable functional groups such as hydroxyl, carboxyl, amine, glycidyl, amide, silane, or acombination thereof. At least one of the one or more crosslinkable functional groups can be a hydroxyl group.

Suitable alkyd resins can include esterification products. Examples can include esterification products of a drying oil fatty acid, such as linseed oil and tall oil fatty acid, dehydrated castor oil, a polyhydric alcohol, a dicarboxylic acid and an aromatic monocarboxylic acid.

The coating composition can further comprise one or more pigments, one or more solvents, ultraviolet light stabilizers, ultraviolet light absorbers, antioxidants, hindered amine light stabilizers, leveling agents, rheological agents, thickeners, antifoaming agents, wetting agents, catalysts, or a combination thereof.

The crosslinking component can further comprise one or more polyisocyanates each having two or more free isocyanate functional groups that react with the crosslinkable functional groups in the crosslinkable component when present. The polyisocyanates can be mixed with the crosslinking activator in the crosslinking component after the SCA is formed in the presence of the alkylated melamines. Alternatively, the crosslinking activator having the SCA formed in the presence of the alkylated melamines can be added into the crosslinking component that contains the polyisocyanates. Examples of polyisocyanates can include aliphatic polyisocyanates, cycloaliphatic polyisocyanates, aromatic polyisocyanates and isocyanate adducts. Examples of suitable aliphatic, cycloaliphatic and aromatic polyisocyanates that can include: 2,4-toluene diisocyanate, 2,6-toluene diisocyanate ("TDI"), 4,4-diphenylmethane diisocyanate ("MDI"), 4,4'-dicyclohexyl methane diisocyanate ("H12MDI"), 3,3'-dimethyl-4,4'-biphenyl diisocyanate ("TODI"), 1,4-benzene diisocyanate, trans-cyclohexane-1, 4-diisocyanate, 1,5-naphthalene diisocyanate ("NDI"), 1,6-hexamethylene diisocyanate ("HDI"), 4,6-xylene diisocyanate, isophorone diisocyanate, ("IPDI"), other aliphatic or cycloaliphatic di-, tri- or tetra-isocyanates, such as, 1,2-propylene diisocyanate, tetramethylene diisocyanate, 2,3-butylene diisocyanate, octamethylene diisocyanate, 2,2,4-trimethyl hexamethylene diisocyanate, dodecamethylene diisocyanate, omega-dipropyl ether diisocyanate, 1,3-cyclopentane diisocyanate, 1,2-cyclohexane diisocyanate, 1,4-cyclohexane diisocyanate, 4-methyl-1,3-diisocyanatocyclohexane, dicyclohexylmethane-4,4'-diisocyanate, 3,3'-dimethyl-dicyclohexylmethane 4,4'-diisocyanate, polyisocyanates having isocyanurate structural units, such as, the isocyanurate of hexamethylene diisocyanate and the isocyanurate of isophorone diisocyanate, the adduct of 2 molecules of a diisocyanate, such as, hexamethylene diisocyanate, uretidiones of hexamethylene diisocyanate, uretidiones of isophorone diisocyanate and a diol, such as, ethylene glycol, the adduct of 3 molecules of hexamethylene diisocyanate and 1 molecule of water, allophanates, trimers and biurets, for example, of hexamethylene diisocyanate, allophanates, trimers and biurets, for example, of isophorone diisocyanate and the isocyanurate of hexane diisocyanate. MDI, HDI, TDI and isophorone diisocyanate are preferred because of their commercial availability.

Tri-functional isocyanates also can be used, such as, triphenyl methane triisocyanate, 1,3,5-benzene triisocyanate, 2,4,6-toluene triisocyanate. Trimers of diisocyanates, such as, the trimer of hexamethylene diisocyanate, sold as Tolonate® HDT from Rhodia Corporation and the trimer of isophorone diisocyanate are also suitable.

An isocyanate functional adduct can be used, such as, an adduct of an aliphatic polyisocyanate and a polyol or an adduct of an aliphatic polyisocyanate and an amine. Also, any of the aforementioned polyisocyanates can be used with a polyol to form an adduct. Polyols, such as, trimethylol alkanes, particularly, trimethylol propane or ethane can be used to form an adduct.

When polyisocyanates are present, the weight ratio of the one or more melamine:the polyisocyanates can be in a range of from 1:0.1 to 1:10.

This disclosure is also directed to a substrate coated with the aforementioned coating composition.

This disclosure is further directed to a process for forming a sag-free coating layer on a substrate. The process comprises the steps of:

B1) applying a coating composition over the substrate to form a sag-free wet coating layer having a wet coating thickness in a range of from 10 to 36 mils, wherein the coating composition comprises:

B1a) a crosslinkable component comprising one or more film forming polymers having one or more crosslinkable functional groups; and B1b) a crosslinking component comprising a crosslinking activator having one or more crosslinking functional groups that react with the crosslinkable functional groups, the crosslinking activator comprises:

a) one or more alkylated melamines that are essentially unreactive to a polyisocyanate; and b) a polyurea sag control agent formed by reacting an amine and an isocyanate in the presence of the one or more alkylated melamines; and B2) curing the sag-free wet coating layer at a temperature in a range of from 15° C. to 60° C. to form the sag-free coating layer.

The polyurea sag control agent can be formed by first adding the amine into the alkylated melamine, and then adding the isocyanate to react with the amine in the presence of the alkylated melamine. The aforementioned isocyanates, amines, or a combination thereof, can be suitable.

The crosslinking component can further comprise aforementioned one or more polyisocyanates each having two or more free isocyanate functional groups. When present, the weight ratio of the melamine:polyisocyanates can be in a range of from 1:0.1 to 1:10.

The coating composition can further comprise one or more pigments, one or more solvents, ultraviolet light stabilizers, ultraviolet light absorbers, antioxidants, hindered amine light stabilizers, leveling agents, rheological agents, thickeners, antifoaming agents, wetting agents, catalysts, or a combination thereof.

The coating composition can comprise up to 80% by weight, based on the weight of the coating composition, of one or more solvents. Typically, the coating composition can have a solid content in a range of from 20% to 80% by weight in one example, in a range of from 50% to 80% by weight in another example and in a range of from 60% to 80% by weight in yet another example, all based on the total weight of the coating composition. The coating composition can also be formulated at 100% solids by using a low molecular weight acrylic resin reactive diluent known to those skilled in the art.

Typical organic solvents suitable for coatings can be used to form the coating composition of this invention. Examples of solvents can include, but not limited to, aromatic hydrocarbons, such as, toluene, xylene; ketones, such as, acetone, methyl ethyl ketone, methyl isobutyl ketone, methyl amyl ketone and diisobutyl ketone; esters, such as, ethyl acetate, n-butyl acetate, isobutyl acetate, and a combination thereof.

The coating composition can comprise in a range of from 0% to 20% of water. Typically, the coating composition can comprise in a range of from 0% to 20% in one example, 0% to 10% in another example, 0% to 5% in yet another example, and 0% to 1% in yet another example, of water, percentage based on the total weight of the coating composition.

The coating composition of this invention can be formulated as a clearcoat or pigmented coating composition. The coating composition can be used as a primer, a basecoat, topcoat, such as colored topcoat. Conventional inorganic and organic colored pigments, metallic flakes and powders, such as, aluminum flake and aluminum powders; special effects pigments, such as, coated mica flakes, coated aluminum flakes colored pigments, or a combination thereof can be used. Transparent pigments or pigments having the same refractive index as the cured binder can also be used. One example of such transparent pigment can be silica.

The coating composition of this invention can also comprise one or more ultraviolet light stabilizers in the amount of 0.1% to 10% by weight, based on the weight of the binder. Examples of such ultraviolet light stabilizers can include ultraviolet light absorbers, screeners, quenchers, and hindered amine light stabilizers. An antioxidant can also be added to the coating composition, in the amount of about 0.1% to 5% by weight, based on the weight of the binder.

Typical ultraviolet light stabilizers that are suitable for this invention can include benzophenones, triazoles, triazines, benzoates, hindered amines and mixtures thereof. A blend of hindered amine light stabilizers, such as Tinuvin® 328 and Tinuvin®123, all commercially available from Ciba Specialty Chemicals, Tarrytown, N.Y., under respective registered trademark, can be used.

Typical ultraviolet light absorbers that are suitable for this invention can include hydroxyphenyl benzotriazoles, such as, 2-(2-hydroxy-5-methylphenyl)-2H-benzotrazole, 2-(2-hydroxy-3,5-di-tert.amyl-phenyl)-2H-benzotriazole, 2[2-hydroxy-3,5-di(1,1-dimethylbenzyl) phenyl]-2H-benzotriazole, reaction product of 2-(2-hydroxy-3-tert.butyl-5-methyl propionate)-2H-benzotriazole and polyethylene ether glycol having a weight average molecular weight of 300, 2-(2-hydroxy-3-tert.butyl-5-iso-octyl propionate)-2H-benzotriazole; hydroxyphenyl s-triazines, such as, 2-[4((2,-hydroxy-3-dodecyloxy/tridecyloxypropyl)-oxy)-2-hydroxy-phenyl]-4,6-bis(2,4-dimethylphenyl)-1,3,5-triazine, 2-[4(2-hydroxy-3-(2-ethylhexyl)-oxy)-2-hydroxyphenyl]-4,6-bis (2,4-dimethylphenyl)1,3,5-triazine, 2-(4-octyloxy-2-hydroxyphenyl)-4,6-bis(2,4-dimethylphenyl)-1,3,5-triazine; hydroxybenzophenone U.V. absorbers, such as, 2,4-dihydroxybenzophenone, 2-hydroxy-4-octyloxybenzophenone, and 2-hydroxy-4-dodecyloxybenzophenone.

Typical hindered amine light stabilizers can include N-(1,2,2,6,6-pentamethyl-4-piperidinyl)-2-dodecyl succinimide, N(1acetyl-2,2,6,6-tetramethyl-4-piperidinyl)-2-dodecyl succinimide, N-(2hydroxyethyl)-2,6,6,6-tetramethylpiperidine-4-ol-succinic acid copolymer, 1,3,5 triazine-2,4,6-triamine, N,N'''-[1,2-ethanediybis[[[4,6-bis[butyl(1,2,2,6,6-pentamethyl-4-piperidinyl) amino]-1,3,5-triazine-2-yl]imino]-3,1-propanediyl]]bis[N, N'''-dibutyl-N',N'''-bis(1,2,2,6,6-pentamethyl-4-piperidinyl)], poly-[[6-[1,1,3,3-tetramethylbutyl)-amino]-1,3,5-trianzine-2,4-diyl][2,2,6,6-tetramethylpiperidinyl)-imino]-1,6-hexane-diyl [(2,2,6,6-tetramethyl-4-piperidinyl)-imino]), bis(2,2,6,6-tetramethyl-4-piperidinyl)sebacate, bis(1,2,2,6,6-pentamethyl-4-piperidinyl)sebacate, bis(1-octyloxy-2,2,6,6-tetramethyl-4-piperidinyl)sebacate, bis(1,2,2,6,6-pentamethyl-4-piperidinyl)[3,5bis (1,1-dimethylethyl-4-hydroxy-phenyl) methyl]butyl propanedioate, 8-acetyl-3-dodecyl-7,7,9,9,-tetramethyl-1,3,8-triazaspiro(4,5)decane-2,4-dione, and dodecyl/tetradecyl-3-(2,2,4,4-tetramethyl-21-oxo-7-oxa-3, 20-diazal dispiro(5.1.11.2)henicosan-20-yl)propionate.

Typical antioxidants that are suitable for this invention can include tetrakis[methylene(3,5-di-tert-butylhydroxy hydrocinnamate)]methane, octadecyl 3,5-di-tert-butyl-4-hydroxyhydrocinnamate, tris(2,4-di-tert-butylphenyl) phosphite, 1,3,5-tris(3,5-di-tert-butyl-4-hydroxybenzyl)-1,3,5-triazine-2,4,6(1H,3H,5H)-trione and benzenepropanoic acid, 3,5-bis(1,1-dimethyl-ethyl)-4-hydroxy-C7-C9 branched alkyl esters. Typically useful antioxidants can also include hydroperoxide decomposers, such as Sanko® HCA (9,10-dihydro-9-oxa-10-phosphenanthrene-10-oxide), triphenyl phosphate and other organo-phosphorous compounds, such as, Irgafos® TNPP from Ciba Specialty Chemicals, Irgafos® 168, from Ciba Specialty Chemicals, Ultranox® 626 from GE Specialty Chemicals, Mark PEP-6 from Asahi Denka, Mark HP-10 from Asahi Denka, Irgafos® P-EPQ from Ciba Specialty Chemicals, Ethanox 398 from Albemarle, Weston 618 from GE Specialty Chemicals, Irgafos® 12 from Ciba Specialty Chemicals, Irgafos® 38 from Ciba Specialty Chemicals, Ultranox® 641 from GE Specialty Chemicals and Doverphos® S-9228 from Dover Chemicals.

The catalysts can include organic metal salts, such as, dibutyl tin dilaurate, dibutyl tin diacetate, dibutyl tin dichloride, dibutyl tin dibromide, zinc naphthenate; compounds containing tertiary amino groups, such as, triethylamine; triphenyl boron, tetraisopropyl titanate, triethanolamine titanate chelate, dibutyl tin dioxide, dibutyl tin dioctoate, tin octoate, aluminum titanate, aluminum chelates, zirconium chelate, hydrocarbon phosphonium halides, such as, ethyl triphenyl phosphonium iodide and other such phosphonium salts, and other catalysts or mixtures thereof known to those skilled in the art.

The coating compositions of this invention can comprise conventional coating additives. Examples of such additives can include wetting agents, leveling and flow control agents, for example, Resiflow®S (polybutylacrylate), BYK® 320 and 325 (high molecular weight polyacrylates), BYK® 347 (polyether-modified siloxane) under respective registered tradmarks, leveling agents based on (meth)acrylic homopolymers; rheological control agents, such as highly disperse silica, or fumed silica; thickeners, such as partially cross-linked polycarboxylic acid or polyurethanes; and antifoaming agents. The additives are used in conventional amounts familiar to those skilled in the art.

The coating composition of this invention can be formulated as a two-pack (2K) coating composition. In a typical two-pack coating composition comprising two packages, the two packages are mixed together shortly before application. The first package typically can contain the crosslinkable component. Optionally, one or more pigments can be dispersed in the first package using conventional dispersing techniques, for example, ball milling, sand milling, and attritor grinding. The first package can also comprise one or more solvents. The second package can contain the crosslinking component, and optionally, one or more solvents. When present, the catalysts and other additives can be added in either the first or the second package prior to mixing. Alternatively, the catalysts and other additives can be added immediately after the first and the second packages are mixed together and before the coating composition is applied to a substrate or cured.

The coating composition can be further adjusted to spray viscosity with organic solvents as determined by those skilled in the art before being applied.

The substrate can be any articles or objects that can be coated with a coating composition. The substrate can be a vehicle or parts of a vehicle. The coating composition according to the disclosure can be suitable for vehicle and industrial coating and can be applied using known processes. In the context of vehicle coating, the coating composition can be used both for vehicle original equipment manufacturing (OEM) coating and for repairing or refinishing coatings of vehicles and vehicle parts. Curing of the coating composition can be accomplished at ambient temperatures, such as temperatures in a range of from 15° C. to 35° C., or at elevated temperatures, such as at temperatures in a range of from 35° C. to 150° C. Typical curing temperatures of 15° C. to 80° C., in particular of 15° C. to 60° C., can be used for vehicle repair or refinish coatings.

The sag-free coating layer is a coating layer that is free from sagging as measured according to ASTM D 4400. The coating composition can be applied by conventional techniques, such as, spraying, electrostatic spraying, dipping, brushing, and flow coating. The coating composition can be applied to a substrate to form a sag-free coating layer having a wet coating thickness, also known as wet film thickness (wft), in a range of, in one example from 5 to 36 mils (about 127 to 914 microns), in another example from 6 to 36 mils (about 152 to 914 microns), in yet another example from 7 to 36 mils (about 178 to 914 microns), in yet another example from 8 to 36 mils (about 203 to 914 microns), in yet another example from 10 to 36 mils (about 254 to 914 microns), in yet another example from 12 to 36 mils (about 305 to 914 microns), in yet another example from 14 to 36 mils (about 356 to 914 microns), and in yet further example from 16 to 36 mils (about 406 to 914 microns). After curing and drying, dry coating thickness can be typically in a range of from 2 to 20 mils. The dry coating thickness can be 2 to 20 mils in one example, 4 to 20 mils in another example, 6 to 20 mils in yet another example, and 7 to 20 mils in further another example.

This disclosure is further directed to a substrate coated by the aforementioned process. Examples of coated substrate can include, but not limited to: home appliances, such as refrigerator, washing machine, dishwasher, microwave ovens, cooking and baking ovens; electronic appliances, such as television sets, computers, electronic game sets, audio and video equipment; recreational equipment, such as bicycles, ski equipment, all terrain vehicles; and home or office furniture, such as tables, file cabinets. In one example, the coated substrate is a vehicle or parts of a vehicle.

The sag-free coating layer can have a distinctness of image (DOI) in a range of from 60 to 100 in one example, 70 to 100 in another example, 80 to 100 in yet another example, and 90 to 100 in a further example.

This disclosure is even further directed to a crosslinking activator for a coating composition. The crosslinking activator comprises:

a) one or more alkylated melamines that are essentially unreactive to a polyisocyanate; and b) a polyurea sag control agent formed by reacting an amine and an isocyanate in the presence of the one or more alkylated melamines.

The aforementioned isocyanate and amines can be suitable.

Sag control agent is typically used to control sagging and therefore improving appearance of a coating and can be a reaction product of an isocyanate and an amine One example of conventional methods is described in U.S. Pat. No. 4,677,028. Microstructures of the SCA can be modified by selecting the isocyanate and the amine, and synthetic conditions. The SCA can also be made in a way that they are soluble in a polar solvent such as N-methyl pyrrolidone to form a SCA solution. Such SCA solution can be conveniently added directly to a coating to achieve the desired rheology or sag control effect. One example of such SCA solution is commercially available as Byk® 410 from Byk Chemie GmbH, Wesel, Germany, sold under respective registered trademark.

One advantage of the coating composition or process of this disclosure is that a sag-free coating layer of high thickness, such as the one having dry coating thickness of more than 6 mils can be formed with a single wet coating layer without the needs for repeatedly drying and applying multiple coating layers. Some substrates, such as blasted steel, may have certain surface profile with surface unevenness in a range of 1-5 mils. A thin coating with a dry coating thickness of about 1-5 mils may not cover the surface unevenness resulting in uneven coating and unacceptable coating appearance. To form a 5 mil dry coating layer, typically a wet coating layer having a wet coating thickness of 10 mils or more can be needed. As described in aforementioned U.S. Pat. No. 4,677,028, coating compositions typically start to show sagging when a dry coating thickness reaches about 2.2 mils (55 microns) to 3.9 mils (100 microns) even in the presence of sag control agents. To achieve desired total dry film thickness and desired appearance, in a traditional process, multiple coating layers have to be applied in succession wherein each coating layer needs to be dried before a subsequent coating layer can be applied thereon. Sanding may be needed between coatings. Such traditional process requires multiple steps to apply multiple coat layers and can be time consuming leading to low productivity. The coating composition of this invention can be used to directly apply over a metal substrate producing a sag-free coating layer having a dry coating thickness of 6 mils or more. In one example, a sage-free coating layer of 6 mils can be produced by applying a single layer of the coating composition over a substrate. In another example, a sage-free coating layer of 7 mils can be produced by applying a single layer of the coating composition over a substrate. The use of the coating composition of this invention can provide improvement to coating productivity.

Applicants unexpectedly discovered that by forming the sag control agent in the presence of alkylated melamine, coating layer can have improved gloss and shorter dry time.

Testing Procedures

Dry Film Thickness—test method ASTM D4138

Viscosity—can be measured using (1) Zahn Viscosity as determined using a #1 Zahn cup according to ASTM D 1084 Method D; (2) Gardner-Holdt Letter scale according to ASTM D1545; or (3) Brookfield viscometer; as specified.

Tg (glass transition temperature) of a polymer is determined according to ASTM D-3418 (1988) or calculated according to the Fox Equation.

Molecular weights Mw and Mn and the polydispersity (Mw/Mn) of the acrylic polymer and other polymers are determined by GPC (Gel Permeation Chromatography) using polystyrene standards and tetrahydrofuran as the solvent.

Dry to touch time—Dry to touch time is determined by ASTM D1640.

Tack Free Time—Tack free time was determined with Mechanical Test Method according to ASTM D 1640-95. The mechanical test method was originally described in U.S. Pat. No. 2,406,989.

DOI—Instrumental measurement of distinctness of Image (DOI) gloss of coating surfaces is determined according to ASTM D 5767.

Sag measurement—Sagging of coatings was measured according to ASTM D 4400 using a multinotch applicator. In brief, a coating composition is applied to a panel to form coating stripes at different thickness using the multinotch applicator. The panel is then positioned vertically with the coating stripes across the panel horizontally. Each stripe is visually examined for sagging. Film thickness of the thickest coating stripe that is sag free is recorded in mils (1 mil=0.0254 mm=0.001 inch). Wet film thickness, also referred to as wet coating thickness, can be determined based on indications of the multi-notch applicator used for coating or with other instruments or methods known to those skilled in the art. Examples of commercially available instruments include wet film thickness measuring wheels or combs. Dry film thickness can be determined with aforementioned method.

Gloss—measured with standard test method for specular gloss according to ASTM D 523.

In the following examples, all parts and percentages are on a weight basis unless otherwise indicated. "Mw" weight average molecular weight and "Mn" means number average molecular weight.

EXAMPLES

The present invention is further defined in the following Examples. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various uses and conditions.

Procedure 1: Preparation of Sag Control Agent

Benzyl amine (available from BASF, Florham Park, N.J.) was mixed with a polymer carrier (Comp SCA) or alkylated melamine (Melamine SCA) (Table 1) and then mixed with 1,6 Hexamethylene Diisocyanate (available from Bayer Material Science, Pittsburg, Pa., USA). The reaction was stirred for 5 minutes.

TABLE 1

Formation of Sag Control Agents (weight in grams).

| Ingredients | Comp SCA | Melamine SCA |
|---|---|---|
| Polymer Carrier [1] | 98.0 | — |
| Alkylated Melamine [2] | — | 98.0 |
| Benzylamine [3] | 1.7 | 1.7 |
| 1,6-Hexamethylene diisocyanate [4] | 0.3 | 0.3 |
| Total | 100.0 | 100.0 |

[1] The polymer carrier used was acrylic polymer Joncryl ® 911 available under respective registered trademark from BASF, Florham Park, NJ 07932, USA.
[2] The alkylated melamine used was Cymel ® XW-3106 available under respective trademark from Cytec Industries, Inc., Wallingford, CT 06492, USA. Cymel ® XW-3106 is unreactive to 1,6-hexamethylene diisocyanate ("HDI") under the conditions disclosed herein.
[3] The Benzylamine was from BASF, Florham Park, NJ 07932, USA.
[4] The isocyanate used was Desmodur ® H available under respective trademark from Bayer, Pittsburgh, PA 15205, USA.

Coating Compositions

Coating compositions were prepared according to Table 2.

TABLE 2

Coating Compositions (in weight grams).

|  | Comp 1 | Comp 2 | Example 1 |
|---|---|---|---|
| Crosslinkable Component [5] | 100 | 100 | 100 |
| Crosslinking Component: | | | |
| Comp SCA from Procedure 1 | 20 | 20 | — |
| Isocyanate Activator [6] | 30 | — | — |
| Catalyst 1 [7] | 2 | — | — |
| Melamine SCA from Procedure 1 | — | — | 20 |
| Alkylated Melamine [2] | — | 25 | — |
| Catalyst 2 [8] | 0 | 3 | 3 |
| Total | 152 | 148 | 123 |
| VOC (lbs/Gal) | 1.1 | 1.0 | 0.4 |

[2] Same as the footnote of Table 1.
[5] The crosslinkable component used was polyurethane Imron ® Industrial Strength 9T02 ™ having hydroxyl crosslinkable functional groups, available under respective registered trademark or trademark from E. I. DuPont de Nemours and Company, Wilmington, DE, USA.
[6] The isocyanate activator used was 9T00-A ® available under respective registered trademark or trademark from E. I. DuPont de Nemours and Company, Wilmington, DE, USA.
[7] The catalyst 1 used was 2,4-pentanedione(98.0%), available as VG-805 ™ under respective registered trademark or trademark from E. I. DuPont de Nemours and Company, Wilmington, DE, USA.
[8] The catalyst 2 used was an acid, available as Cycat ® 600 under respective trademark from Cytec Industries, Inc., Wallingford, CT 06492, USA.

Coating Properties

The coating compositions were applied on 4×12" cold rolled steel panels available from East Coast Steel Incorporated, Salina Rd, Sewell, N.J., USA), using wet draw down and cured at 75° F. for 90 minutes to form a dry coating layer at various thicknesses.

Coating property data are shown in Table 3. The data indicated that the coating composition of this disclosure (Examples 1) had improved gloss at 60°, higher sag-free wet coating thickness of 12 mils (about 305 microns), and shorter drying time.

TABLE 3

Coating Properties.

|  | Comp 1 | Comp 2 | Example 1 |
|---|---|---|---|
| Gloss at 60° | 90 | 92 | 95 |
| Maximum Sag-Free Wet Coating Thickness (mils) | 8 | 9 | 12 |
| Dry to Touch (Hour) | 1.5 | 1.5 | 1 |

What is claimed is:

1. A coating composition comprising:
   100 parts of a crosslinkable component comprising a film forming acrylate-polyester having a hydroxyl crosslinkable functional group; and
   a crosslinking component comprising an alkylated melamine crosslinking activator having a crosslinking functional group that reacts with the hydroxyl crosslinkable functional group, the crosslinking activator comprising:
      90 to 99 wt % of an alkylated melamine that is essentially unreactive to 1,6-hexamethylene diisocyanate; and
      0.2 to 5 wt % of a polyurea sag control agent formed by reacting benzylamine and 1,6-hexamethylene diisocyanate in the presence of the alkylated melamine,
   wherein said coating composition produces a cured sag-free coating layer having a gloss at 60° of 95 measured when the coating layer has a sag-free wet coating thickness of about 12 mils.

2. The coating composition of claim 1, wherein the alkylated melamine comprises an alkylation group selected from C1-C10 alkyls.

3. The coating composition of claim 1 further comprising a pigment, a solvent, an ultraviolet light stabilizer, an ultraviolet light absorber, an antioxidant, a hindered amine light stabilizer, a leveling agent, a rheological agent, a thickener, an antifoaming agent, a wetting agent, a catalyst, or a combination thereof.

4. The coating composition of claim 1, wherein the crosslinking component further comprises a polyisocyanate having two or more free isocyanate functional groups.

5. The coating composition of claim 4, wherein the weight ratio of alkylated melamine:polyisocyanates is in a range of from about 1:0.1 to about 1:10.

6. A process for forming a sag-free coating layer on a substrate, the process comprising the steps of:
   applying a coating composition over the substrate to form a sag-free wet coating layer having a wet coating thickness in a range of from about 12 to about 36 mils, wherein the coating composition comprises:
   100 parts of a crosslinkable component comprising a film forming acrylate-polyester having a hydroxyl crosslinkable functional group; and
   a crosslinking component comprising an alkylated melamine crosslinking activator having a crosslinking functional group that reacts with the hydroxyl crosslinkable functional group, the crosslinking activator comprising:
      90 to 99 wt % of an alkylated melamine that is essentially unreactive to 1,6-hexamethylene diisocyanate; and
      0.2 to 5 wt % of a polyurea sag control agent formed by reacting benzylamine and 1,6-hexamethylene diisocyanate in the presence of the alkylated melamine; and
   curing the sag-free wet coating layer at a temperature in a range of from 15° C. to 60° C. to form the sag-free coating layer that has a gloss at 60° of 95 measured when the coating layer has a sag-free wet coating thickness of about 12 mils.

7. The process of claim 6, wherein the coating composition further comprises a pigment, a solvent, an ultraviolet light stabilizer, an ultraviolet light absorber, an antioxidant, a hindered amine light stabilizer, a leveling agent, a rheological agent, a thickener, an antifoaming agent, a wetting agent, a catalyst, or a combination thereof.

8. The process of claim 6, wherein the crosslinking component further comprises a polyisocyanate having two or more free isocyanate functional groups.

9. The process of claim 6, wherein the weight ratio of alkylated melamine:polyisocyanate is in a range of from about 1:0.1 to about 1:10.

10. The coating composition of claim 1, wherein the cross-linking component is present in an amount of about 23 parts.

11. The coating composition of claim 10 wherein the melamine crosslinking activator is present in an amount of 20 parts and the cross-linking component further comprises a catalyst present in an amount of about 3 parts, each based on a total weight of the cross-linking component.

12. The coating composition of claim 11 wherein the cross-linking component further comprises a catalyst that comprises 2,4-pentanedione.

13. The process of claim 6, wherein the cross-linking component is present in an amount of about 23 parts.

14. The process of claim 13 wherein the alkylanted melamine crosslinking activator is present in an amount of 20 parts and the cross-linking component further comprises a catalyst present in an amount of about 3 parts, each based on a total weight of the cross-linking component.

15. The process of claim 14 wherein the cross-linking component further comprises a catalyst that comprises 2,4-pentanedione.

16. The coating composition of claim 1, wherein the alkylated melamine comprises methyl groups.

17. The coating composition of claim 16, wherein the alkylated melamine is fully alkylated with methyl groups.

18. The process of claim 6, wherein the alkylated melamine comprises methyl groups.

19. The process of claim 6, wherein the alkylated melamine is fully alkylated with methyl groups.

20. A coating composition comprising:
   100 parts of a crosslinkable component comprising a film forming acrylate-polyester having a hydroxyl crosslinkable functional group; and
   a crosslinking component comprising a methylated melamine crosslinking activator having a crosslinking functional group that reacts with the hydroxyl crosslinkable functional group, the crosslinking activator comprising:
      98 wt % of a fully methylated melamine that is essentially unreactive to 1,6-hexamethylene diisocyanate; and
      2 wt % of a polyurea sag control agent formed by reacting benzylamine and 1,6-hexamethylene diisocyanate in the presence of the fully methylated melamine,
   wherein said coating composition produces a cured sag-free coating layer having a gloss at 60° of 95 measured when the coating layer has a sag-free wet coating thickness of 12 mils.

* * * * *